United States Patent [19]

Gerner

[11] 4,384,432
[45] May 24, 1983

[54] GRINDING MACHINE

[75] Inventor: Heinz Gerner, Coburg, Fed. Rep. of Germany

[73] Assignee: Werkzeugmaschinenfabrik Adolf Waldrich Coburg GmbH & Co., Coburg, Fed. Rep. of Germany

[21] Appl. No.: 264,527

[22] Filed: May 18, 1981

[30] Foreign Application Priority Data

Jun. 4, 1980 [DE] Fed. Rep. of Germany ....... 3021065

[51] Int. Cl.³ .............................................. B24B 5/00
[52] U.S. Cl. ......................... 51/134.5 R; 51/DIG. 16; 318/359; 408/241 G; 408/710
[58] Field of Search .................. 51/134.5 R, DIG. 16; 318/486, 663, 357–359; 408/241 G, 710; 361/51, 239, 242

[56] References Cited

U.S. PATENT DOCUMENTS 1,811,873 6/1931 Belden et al. ................... 51/134.5 R
2,471,561 5/1949 Fielding ........................ 51/134.5 R Primary Examiner—James G. Smith
Assistant Examiner—Douglas D. Watts
Attorney, Agent, or Firm—Flynn, Thiel, Boutell & Tanis

[57] ABSTRACT

A device for automatically limiting the steplessly adjustable speed of a drive motor for the spindle of a grinding machine to a speed which is the maximum permissible motor speed for the grinding wheel currently being used has a motor-driven speed regulator which, upon a stopping of the spindle, returns automatically to an initial position corresponding to the lowest permissible motor speed and has exchangeable protective hoods associated with respective grinding wheel diameters and types which can be releasably secured on the grinding spindle housing. Each protective hood, with the exception of the protective hood for the grinding wheel with the lowest maximum permissible speed, has associated with it a receptacle with several contacts which, depending on the maximum permissible speed for the associated grinding wheel, has two contacts connected by an electrical bridge. By plugging a corresponding multicontact plug into the receptacle, a respective limit switch associated with the respective maximum permissible speed is made effective by the bridge, which limit switch stops the motor driving the speed regulator when such maximum permissible speed is reached. If no bridge is present, the limit switch associated with the lowest maximum permissible speed is made effective.

2 Claims, 6 Drawing Figures

GRINDING MACHINE

FIELD OF THE INVENTION

This invention relates to a device for automatically limiting the steplessly adjustable speed of a drive motor for the spindle of a grinding machine to a speed which is the maximum permissible speed for the size of the grinding wheel currently being used, which comprises a motor-driven speed regulator which, upon a stopping of the spindle, returns automatically to an initial position corresponding to the lowest permissible motor speed, and comprises exchangeable protective hoods which are associated with respective grinding wheel diameters and types and can be releasably secured on the grinding spindle housing.

BACKGROUND OF THE INVENTION

In grinding machines, care must be taken that the maximum permissible speed of the grinding wheel is not exceeded. In a conventional grinding machine of the above-described type, the manner of preventing impermissibly high spindle speeds includes the regulating member of the speed regulator being returned automatically after each stopping of the spindle to a minimum speed determined by the largest grinding wheel. After a grinding wheel exchange, the operator must, prior to increasing motor speed, inform himself through a table which contains the permissible speed ranges for various grinding wheel diameters of the maximum permissible speed for the grinding wheel just mounted. Only then is he permitted to increase the motor speed by means of a regulating potentiometer, but not beyond the maximum permissible speed. Simultaneous with the grinding wheel exchange, respective protective hoods corresponding to the shape and diameter of the respective grinding wheels and mountable on the spindle housing are exchanged. These safety precautions, however, depend entirely on the conscientiousness of the operator and are no longer considered sufficient today.

Therefore, a basic purpose of the present invention is to provide a device for automatically limiting the steplessly adjustable speed of a drive motor for the spindle of a grinding machine to a speed which is the maximum permissible speed for the size of the grinding wheel currently being used, which grinding machine has a simple and reliable structure and avoids exceeding a maximum permissible speed in a manner independent of the conscientiousness of the operator.

SUMMARY OF THE INVENTION

This is achieved according to the invention by associating with each protective hood, with the possible exception of the protective hood for the grinding wheel with the lowest maximum permissible speed, a receptacle having several contacts. Depending on the maximum permissible speed for the respective grinding wheel associated with the protective hood, two respective contacts of the receptacle are connected by an electrical bridge. By inserting a corresponding multicontact plug into a receptacle, one of several limit switches which are each associated with a respective maximum permissible speed and stop the motor driving the speed regulator when the maximum speed is reached is made effective by the bridge in the receptacle, the limit switch associated with the lowest maximum permissible speed being made effective if no bridge is present.

With this, it is assured that after each exchange of a grinding wheel, its maximum permissible speed cannot be exceeded. When exchanging one grinding wheel for another with different dimensions, the protective hood for the latter wheel must be mounted. The control circuit is designed so that, after plugging a plug connected to the control circuit in the spindle housing through a cable or the like into the receptacle mounted on the appropriate protective hood, the maximum permissible speed for the largest grinding wheel which can be received within the protective hood cannot be exceeded. This is done by using the bridge associated with the respective grinding wheel diameter and type to select a corresponding limit switch or the like which is in the speed regulator and associated with the desired maximum speed, so that upon reaching such speed a further speed increasing movement of the regulating member of the speed regulator is prevented. However, if the selection of the mentioned limit switch is not effected, for example, because the operator forgets to plug the plug in or because of a contact breakdown, for example, a cable breakage, then it is not possible to exceed the maximum permissible speed for the grinding wheel with the largest diameter. This new safety precaution thus offers maximum protection against exceeding maximum permissible speeds for each of various grinding wheel diameters and types.

An advantageous development of the invention consists of providing in the path of movement of the regulating member several limit switches which are associated with various maximum permissible speeds and of providing in series with each of such limit switches a switch which can be closed by a respective one of the bridge connections, wherein the limit switches and the switches associated with them are connected in parallel in the control circuit for a servomotor which drives the regulating member.

BRIEF DESCRIPTION OF THE DRAWINGS

One exemplary embodiment of the invention will be discussed in greater detail hereinafter in connection with the drawings, in which.

DETAILED DESCRIPTION

Figure 1A:
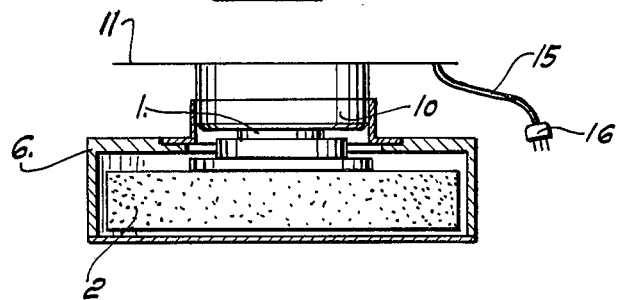
FIGS. 1a–1d are cross-sectional side views illustrating grinding wheels of various shapes and diameters mounted on a grinding machine and various protective hoods associated therewith.
Figure 1B:
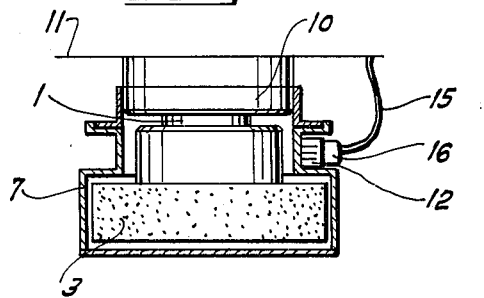
Figure 1C:
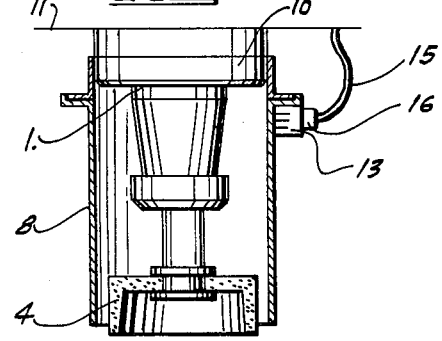
Figure 1D:
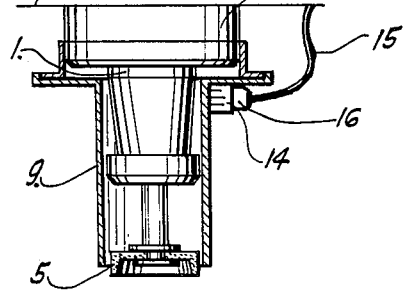

Grinding wheels 2,3,4 and 5 having different diameters and shapes can be releasably secured to the free end of a spindle 1 of a grinding machine according to FIGS. 1a to 1d. Each of the grinding wheels 2,3,4 and 5 has associated with it a respective protective hood 6,7,8 or 9 which corresponds in size and shape to the diameter and shape of the grinding wheel and which can be clamped releasably secured in a conventional manner to a shoulder 10 of the grinding spindle housing 11, which shoulder 10 surrounds the grinding spindle 1. A respective receptacle 12,13 or 14 is provided on each of the protective hoods 7,8 and 9. The protective hood 6 associated with the grinding wheel 2 having the largest diameter does not need a receptacle.

Each of the receptacles 12, 13 and 14 has a plurality of contacts K1, K2, K3, K4, K5 and K6. The diameter and the shape of the grinding wheel 3, 4 or 5 used with a particular protective hood 7, 8 or 9, determines its maximum permissible speed, different maximum speeds being appropriate for each of the wheels 2-5, and two of the contacts K1 to K6 in the associated receptacle are connected by a bridge or short-circuit to indicate the maximum speed. It is assumed that the maximum permissible speed is 1,100 rotations per minute for the grinding wheel 2 with the largest diameter, 1,650 rotations per minute for the grinding wheel 3, 1,530 rotations per minute for the grinding wheel 4, and 2,500 rotations per minute for the grinding wheel 5. The contacts K1 and K2 are connected by a bridge in the receptacle 12 of the protective hood 7, the contacts K3 and K4 are connected in the receptacle 13 and the contacts K5 and K6 are connected in the receptacle 14.

Figure 2:
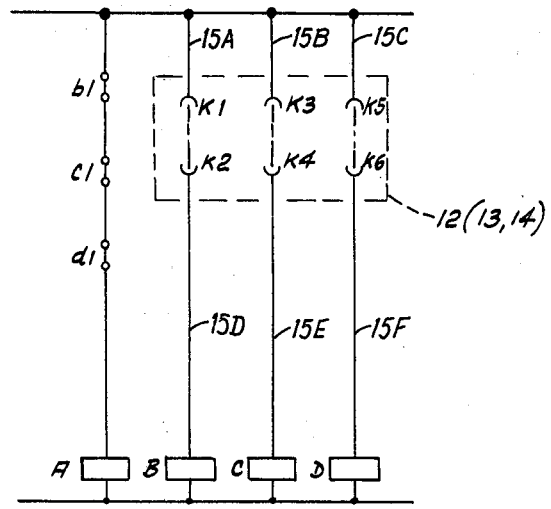
FIGS. 2 and 3 are schematic circuit diagrams illustrating portions of the electrical control system for the grinding machine of FIGS. 1a–1d.
Figure 3:
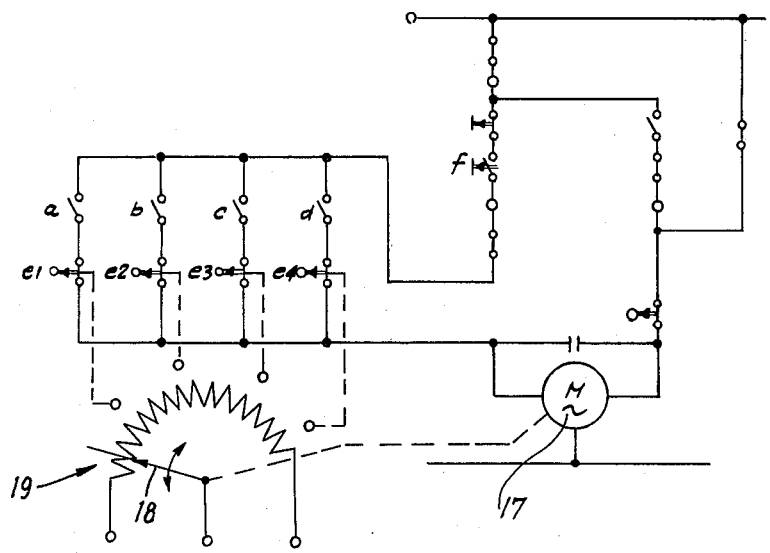

A multicontact plug 16, which in the illustrated embodiment is a six-contact plug, is connected to a control circuit in the grinding machine spindle housing 11 by a multiwire cable 15. Three of the lines 15A, 15B and 15C (FIG. 2) in the cable connect the receptacle contacts K1, K3 and K5 to a source of power and the other three lines 15D, 15E and 15F connect the contacts K2, K4 and K6 to respective normally open contactors B, C and D. The contactors B, C and D control respective normally open switches b, c and d illustrated in FIG. 3 in the control circuit for a servomotor 17 and respective normally closed switches b1, c1 and d1 (FIG. 2) which, when closed, activate a contactor A. The servomotor 17 drives the wiper or lever 18 of a ring-slide resistor 19 which regulates the field voltage of the grinding spindle drive motor in a conventional and not-illustrated manner. Each of the switches b, c and d is connected in series with a respective normally closed limit switch e2, e3 and e4. The limit switches e2, e3 and e4 are positioned at various points in the path of movement of the resistor lever 18 for activation thereby, the position of each limit switch e2, e3 and e4 corresponding to a certain field voltage and thus a certain speed of the grinding spindle drive motor. A further normally closed limit switch e1 is serially connected to a normally open switch a which is controlled by the contactor A (FIG. 2). As can also be seen in FIG. 3, the limit switches e1, e2, e3 and e4 and associated switches a, b, c and d are connected in parallel.

If the grinding wheel 2 having the largest diameter is mounted on the grinding spindle 1, then the plug 16 cannot be plugged into a receptacle because the protective hood 6 does not have a receptacle. Since the plug 16 is not plugged into any receptacle, no bridges connect any of the contacts K1, K2, K3, K4, K5 or K6 and the unactivated contactors B, C, D keep the switches b1, c1 and d1 closed and contactor A activated. Through this, the switch a is kept closed by the activated contactor A and thus the limit switch e1 is made effective. The limit switch e1 is associated with the lowest maximum permissible speed which, in the described exemplary embodiment, is 1,100 rotations per minute. If now a sensing switch f is manually operated to speed up the grinding motor, power flows to the servomotor 17 through switches f, a and e1 and the servomotor 17 moves the lever 18 of the ring-slide resistor 19 in a direction (clockwise in FIG. 3) which increases the field voltage of the grinding spindle drive motor and thus its speed.

The lever 18, however, is moved by the servomotor 17 only so long as the switch f is closed or until the lever 18 reaches and opens the limit switch e1. The limit switch e1 is positioned so that the lever 18 opens it when the associated field voltage corresponds to a speed of 1,100 rotations per minute. Since the opened limit switch e1 prevents the flow of power to servomotor 17 and thereby prevents further movement of the lever 18 in a direction which would cause the grinding motor to run faster, the speed of 1,100 rotations per minute cannot be exceeded. This would also be true if, after a grinding wheel exchange occurred, the operator forgot to connect the plug 16 to the receptacle 12, 13 or 14 of the protective hood 7, 8 or 9, since none of the contactors B, C or D could be activated. Each time the grinding spindle 1 is stopped, the lever 18 of the ring-slide resistor 19 is automatically moved back to the initial position of FIG. 3 in a conventional manner by the servomotor 17 and the illustrated circuit, which initial position corresponds with the lowest possible motor speed, for example, 850 rotations per minute.

If the grinding wheel 2 is, for example, replaced with the grinding wheel 3, the protective hood 6 is simultaneously removed from the shoulder 10 and is replaced with the protective hood 7, and the operator then plugs the plug 16 into the receptacle 12. The contactor B is then activated by the bridge provided between the contacts K1 and K2 and activates contactor B. Contactor B then closes switch b and opens switch b1, thereby deactivating contactor A and causing the normally closed switch a to be opened by the contactor A. With this, the limit switch e2 is made effective. By pressing and holding the sensing switch f, the lever 18 of the resistor 19 is moved by the servomotor 17 in the direction causing the grinding motor to run faster, but only until it activates the limit switch e2, which occurs at the speed of 1,650 rotations per minute. It is not possible to exceed this speed, since only the bridge between the contacts K1 and K2 exists at the protective hood 7 for the grinding wheel 3 and contactors C and D are not activated.

The limit switches e3 and e4 are made effective in the same manner during use of the grinding wheel 4 or 5, the associated protective hood 8 or 9, and the receptacle 13 or 14, due to the bridges between the contacts K3 and K4 or K5 and K6, respectively.

In the exemplary embodiment, the protective hood 6 for the largest diameter grinding wheel 2 does not have a receptacle, because a receptacle is not needed for proper operation. However, it is advantageous in practice to provide a blind receptacle on the protective hood 6, namely, a receptacle which does not contain a bridge, for example, to prevent damage to the cable 15 or the plug 16.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for automatically limiting the continuously, steplessly adjustable speed of a drive motor for the spindle of a grinding machine to a speed which is the highest permissible speed for the grinding wheel currently being used, comprising a motor-drivable speed regulator which, upon a stopping of the spindle, returns automatically to an initial position corresponding to the lowest permissible motor speed and comprising respective, exchangeable protective hoods associated with grinding wheels of different diameter and type, which hoods can be secured on the grinding spindle housing, the improvement comprising wherein each protective hood, with the exception of the protective hood for the grinding wheel having the lowest permissible speed, has a receptacle with several contacts and, based on the highest permissible speed for the grinding wheel which fits with the protective hood, two such contacts are connected electrically through a bridge, wherein by inserting a corresponding multicontact plug into one of the respective receptacles the associated bridge makes effective a respective limit switch which is associated with the respective maximum permissible speed for the grinding wheel and which stops the motor driving the speed regulator when the regulator reaches a point corresponding to such maximum permissible speed, and wherein the absence of any kind of a said bridge causes the limit switch associated with the lowest permissible drive motor speed to be made effective.

2. The device according to claim 1, wherein in the path of movement of the lever of the regulator there are provided several said limit switches associated with respective maximum permissible speeds and wherein in series with each of said limit switches a switch is connected which can be closed due to the respective bridge connection, the limit switches and the switches associated with them being connected in parallel in the circuit of a servomotor which drives the lever of the regulator.

* * * * *